(12) United States Patent
Poletto et al.

(10) Patent No.: US 7,581,023 B2
(45) Date of Patent: Aug. 25, 2009

(54) ARCHITECTURE TO THWART DENIAL OF SERVICE ATTACKS

(75) Inventors: Massimiliano Antonio Poletto, Cambridge, MA (US); Robert Nader Nazzal, Watertown, MA (US); Dimitri Stratton Vlachos, Somerville, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 529 days.

(21) Appl. No.: 10/137,744

(22) Filed: Apr. 30, 2002

(65) Prior Publication Data

US 2003/0204621 A1    Oct. 30, 2003

(51) Int. Cl.
*G06F 15/173* (2006.01)
*G06F 12/16* (2006.01)

(52) U.S. Cl. .................................. 709/239; 726/22

(58) Field of Classification Search ......... 709/223–225, 709/238–239, 245; 713/201; 726/11–23
See application file for complete search history.

(56) References Cited

U.S. PATENT DOCUMENTS

| 6,735,702 | B1* | 5/2004 | Yavatkar et al. ............. 713/201 |
| 6,779,118 | B1* | 8/2004 | Ikudome et al. ............. 713/201 |
| 6,873,600 | B1* | 3/2005 | Duffield et al. ............. 370/252 |
| 2002/0073337 | A1* | 6/2002 | Ioele et al. ................... 713/201 |
| 2002/0157021 | A1* | 10/2002 | Sorkin et al. ................ 713/201 |
| 2002/0166067 | A1* | 11/2002 | Pritchard et al. ............ 713/201 |
| 2002/0178374 | A1* | 11/2002 | Swimmer et al. ........... 713/200 |
| 2003/0014665 | A1* | 1/2003 | Anderson et al. ........... 713/201 |

* cited by examiner

*Primary Examiner*—Yasin M Barqadle
(74) *Attorney, Agent, or Firm*—Park, Vaughan & Fleming LLP (57) ABSTRACT

An arrangement is disposed in a network. The arrangement includes a device that is logically disposed adjacent logically nearby routers having a first type of probe that are disposed to sample traffic, and that is has second type of probe that is disposed in-line during an attack by modifying router tables on the nearby routers.

16 Claims, 7 Drawing Sheets

ARCHITECTURE TO THWART DENIAL OF SERVICE ATTACKS

BACKGROUND

This invention relates to techniques to thwart network-related denial of service attacks.

In denial of service attacks, an attacker sends a large volume of malicious traffic to a victim. In one approach an attacker, via a computer system connected to the Internet infiltrates one or a plurality of computers at various data centers. Often the attacker will access the Internet through an Internet Service Provider (ISP). The attacker by use of a malicious software program places the plurality of computers at the data centers under its control. When the attacker issues a command to the computers at the data centers, the machines send data out of the data centers at arbitrary times. These computers can simultaneously send large volumes of data over various times to the victim preventing the victim from responding to legitimate traffic.

SUMMARY

According to an aspect of the invention, an arrangement is disposed in a network. The arrangement includes a device that is logically disposed adjacent logically nearby routers having a first type of probe that are disposed to sample traffic, and that is has second type of probe that is disposed in-line during an attack by modifying router tables on the nearby routers.

According to an additional aspect of the invention, a method of thwarting denial of service attacks through a network, the method includes sampling network traffic over the network and monitoring a state of the network and disposing an active device in-line during an attack by modifying router tables on the nearby routers.

According to a still further aspect of the invention, a device includes a cluster head and a plurality of passive probes disposed between a network and a victim center, the passive probes collecting statistical data, for performance of intelligent traffic analysis. The device also includes a second plurality of active probes disposed in-line with a network and disposed to receive network traffic to permit filtering of the network traffic to thwart a denial of service attack.

One or more aspects of the invention may provide one or all of the following advantages.

Aspects of the invention provide an architecture to detect and thwart denial service attacks on data centers. Large customers can deploy the system without providing another chokepoint in their network. Additionally, this deployment obviates the need to make the system capable of saturated line rate speeds. The deployment scheme places the system in-line during attack by modifying router tables on nearby routers. All other times, the system is passively monitoring for attacks. It is most desirable to have an enforcement system in-line during an actual attack. Whereas, a firewall needs to be in-line all of the time to filter unauthorized traffic.

Additional benefits of this approach include eliminating enforcement as a choke point unless a nearby router is instructed to route traffic through active probes. The manager of a router would route only that traffic destined to specific victim machine(s) through the active probes for filtering. Because only victim traffic is routed through the the active probes, the packet rate performance is less of an issue than it would be if the active probes that perform enforcement had to deal with all traffic for the data center.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
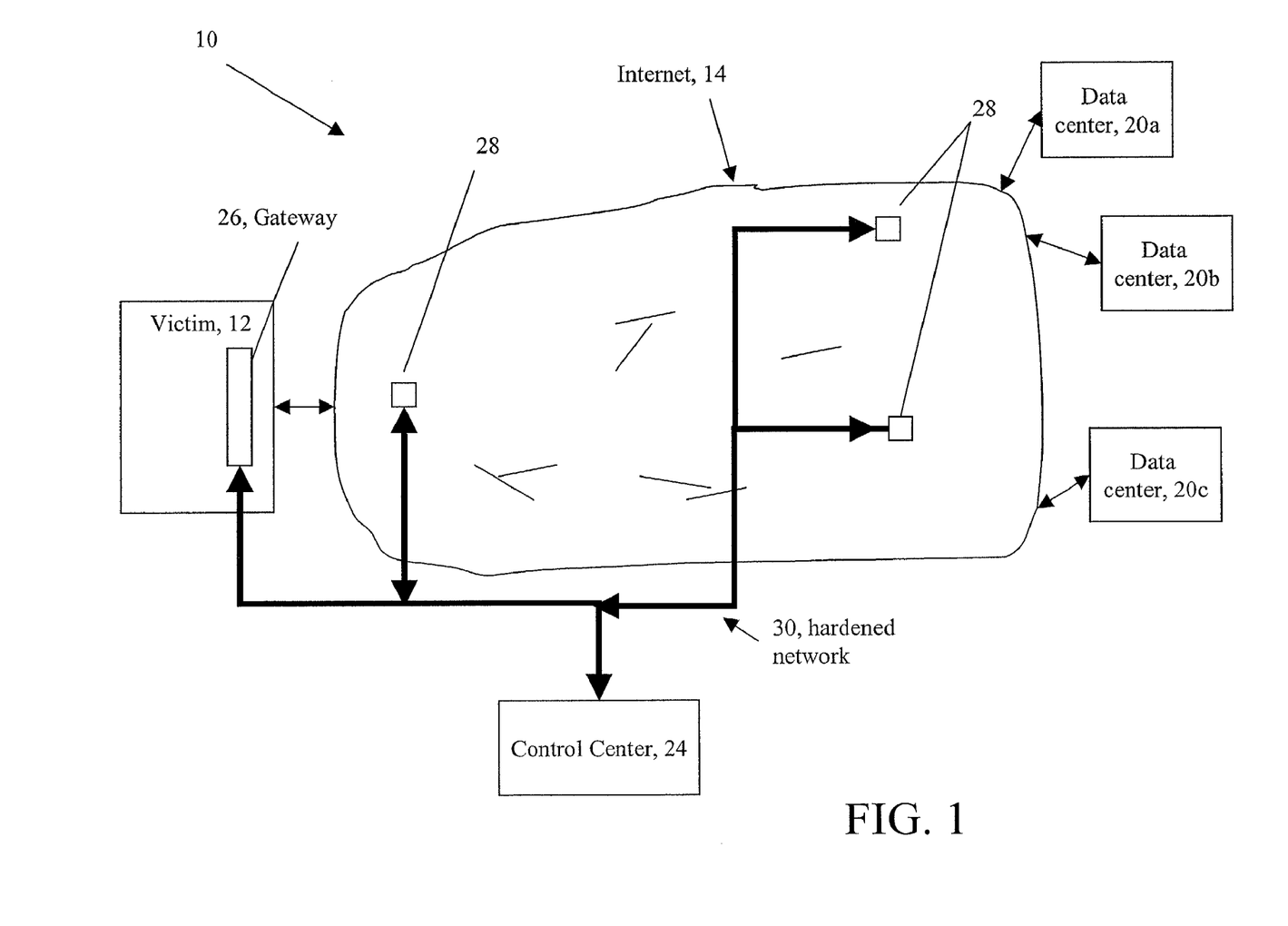
FIG. 1 is a block diagram of networked computers showing an architecture to thwart denial of service attacks.

Referring to FIG. 1, an arrangement 10 to thwart denial of service attacks (DoS attacks) is shown. The arrangement 10 is used to thwart an attack on a victim data center 12, e.g., a web site or other network site under attack. The victim 12 is coupled to the Internet 14 or other network. For example, the victim 12 has a web server located at a data center (not shown).

An attacker via a computer system 16 that is connected to the Internet e.g., via an Internet 14 Service Provider (ISP) 18 or other approach, infiltrates one or a plurality of computers at various other sites or data centers 20a-20c. The attacker by use of a malicious software program 21 that is generally surreptitiously loaded on the computers of the data centers 20a-20c, places the plurality of computers in the data centers 20a-20c under its control. When the attacker issues a command to the data centers 20a-20c, the data centers 20a-20c send data out at arbitrary times. These data centers 20a-20c can simultaneously send large volumes of data at various times to the victim 12 to prevent the victim 12 from responding to legitimate traffic.

The arrangement 10 to protect the victim includes a control center 24 that communicates with and controls gateways 26 and data collectors 28 disposed in the network 14. The arrangement protects against DoS attacks via intelligent traffic analysis and filtering that is distributed throughout the network. The control center 24 is coupled to the gateways 26 and data collectors 28 by a hardened, redundant network 30. In preferred embodiments, the network is inaccessible to the attacker. The gateway 26 devices are located at the edges of the Internet 14, for instance, at the entry points of data centers. The gateway devices 26 constantly analyze traffic, looking for congestion or traffic levels that indicate the onset of a DoS attack. The data collectors 28 are located inter alia at major peering points and network points of presence (PoPs). The data collectors 28 sample packet traffic, accumulate, and collect statistical information about network flows.

All deployed devices e.g., gateways 26 and data collectors 28 can be linked to the central control center 24. The control center aggregates traffic information and coordinates measures to track down and block the sources of an attack. The arrangement uses a distributed analysis approach that emphasizes the underlying characteristics of a DoS attack, i.e., congestion and slow server response, to produce a robust and comprehensive response to a denial of service attack. Thus, the architecture 10 can also stop new attacks rather than solutions that can only stop previously seen attacks. Furthermore, the distributed architecture 10 will frequently stop an attack near its source, before it uses bandwidth on the wider Internet 14 or congests access links to the targeted victim 12.

In some embodiments, gateway 26 can be a single device whereas in other embodiments, as described in conjunction with FIG. 2 below, gateway 26 is a clustered gateway, which is used to monitor a plurality of links that exist between the victim center 12 and the Internet 14. A computer program product resides on a computer readable medium (not shown) for carrying out functions involved in thwarting denial of service attacks on the gateway, with instructions for causing a machine, such as the gateway 26 to sample network traffic over the network, monitor a state of the network and dispose an active device in-line during an attack by modifying router tables on the nearby routers.

Figure 2:
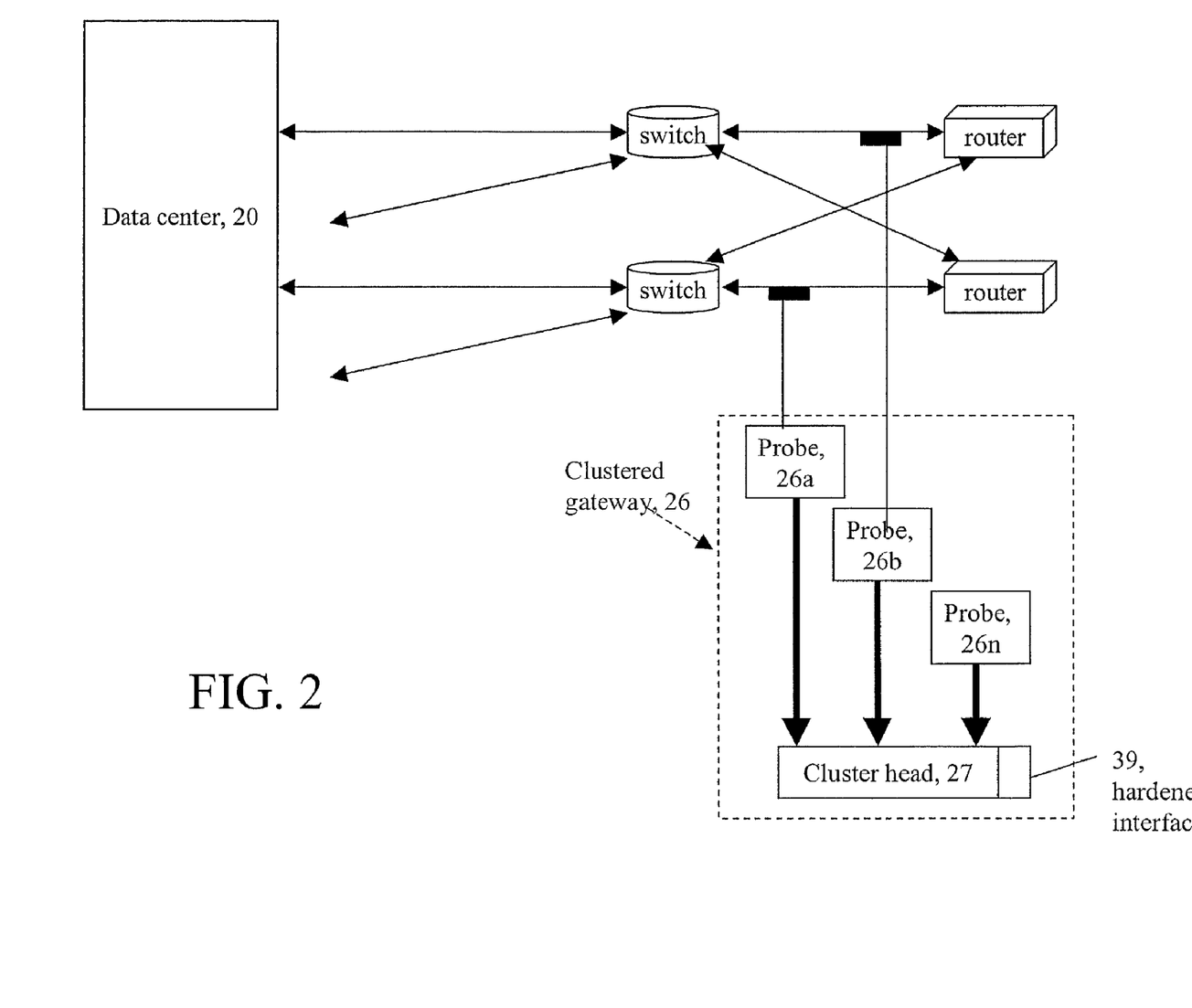
FIG. 2 is a block diagram depicting deployment of portions of a clustered monitor.

Referring now to FIG. 2, gateway 26 is a clustered gateway and has two separate functions. One function is inspection, which is used to inspect traffic to detect attacks and the other is enforcement that is used to filter traffic that is part of an attack. The data center 20 has a plurality of links 21a-21n with the Internet 14. The links exist through various network architectural arrangements, the details of which are not an important consideration here. The data center 20 is protected by the clustered gateway 26 that comprises a plurality of passive probe devices 26a-26n, which are disposed to tap off network traffic on the links between the data center 20 and the Internet 14. The passive probe devices 26a-26n have connections to a cluster head device 27.

The cluster head 27 likewise can have an optional and/or hardened redundant network interface connection to a hardened/redundant network 30. This interface is used to connect the cluster head 27 to the control center 24 (FIG. 1).

Passive probes 26a-26n perform several inspection functions such as sampling of packets and producing statistical counting of packets. The passive probes 26a-26n examine packets for statistical analysis purposes and randomly choose selected numbers of packets per second to pass to the cluster head 27. The cluster head 27 is responsible for receiving the sampled traffic packets and summary information provided from the passive probes 26a-26n. The cluster head 27 and or the passive probes can analyze the traffic for detection of denial of service attacks using any known algorithms or the algorithms described below. The cluster head 27 also provides a user interface via a computer and monitor (not shown) into the traffic analysis, and can also communicate with the control center 24. The cluster head 27 is connected to the passive probes 26a-26n. In one embodiment, a network type of connection provides connectivity between the cluster head 27 and passive probes 26a-26n. An exemplary type of network connection is a 100 Mbit Ethernet network. Other connections and other network configurations, of course, could be used. Preferably this connection is a private network used for inter-cluster communications. As passive probes 26a-26n start up they are either permanently part of the cluster or can execute a routine to join the cluster gateway 26. The probes obtain an IP address on the network, and begin sending sample packets and statistical information to the cluster head 27 as will be described below.

Figure 3:
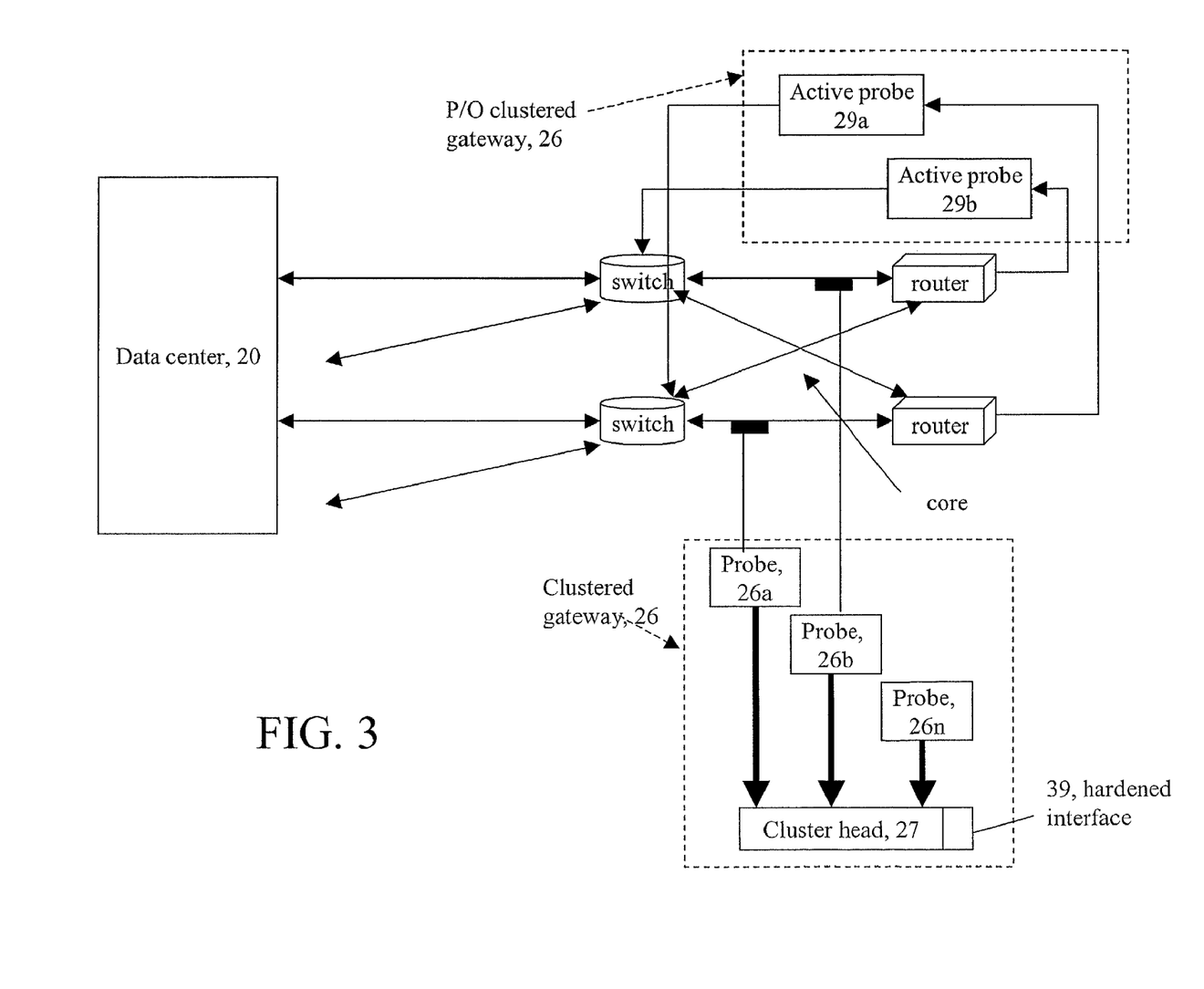
FIG. 3 is a block diagram depicting deployment of the clustered monitor during a denial of service attack.

Referring now to FIG. 3, the clustered gateway 26 also includes active probes 29a-29n that are deployed in a manner that allows the active probes 29a-29n to be placed in-line during an attack. By in-line is meant that packets with destination addresses for the victim data center 12 are sent directly to and through the active probe device(s) 29a-29n by executing routing changes on nearby routers. In one embodiment, the active probe can communicate directly with the cluster head in a similar manner as the passive probes 26 communicate with the cluster head 27. This allows an arbitrary number of passive and active probes attached to the cluster head 27. Traffic can be rerouted through the active probes whenever an attack is detected.

Figure 4:
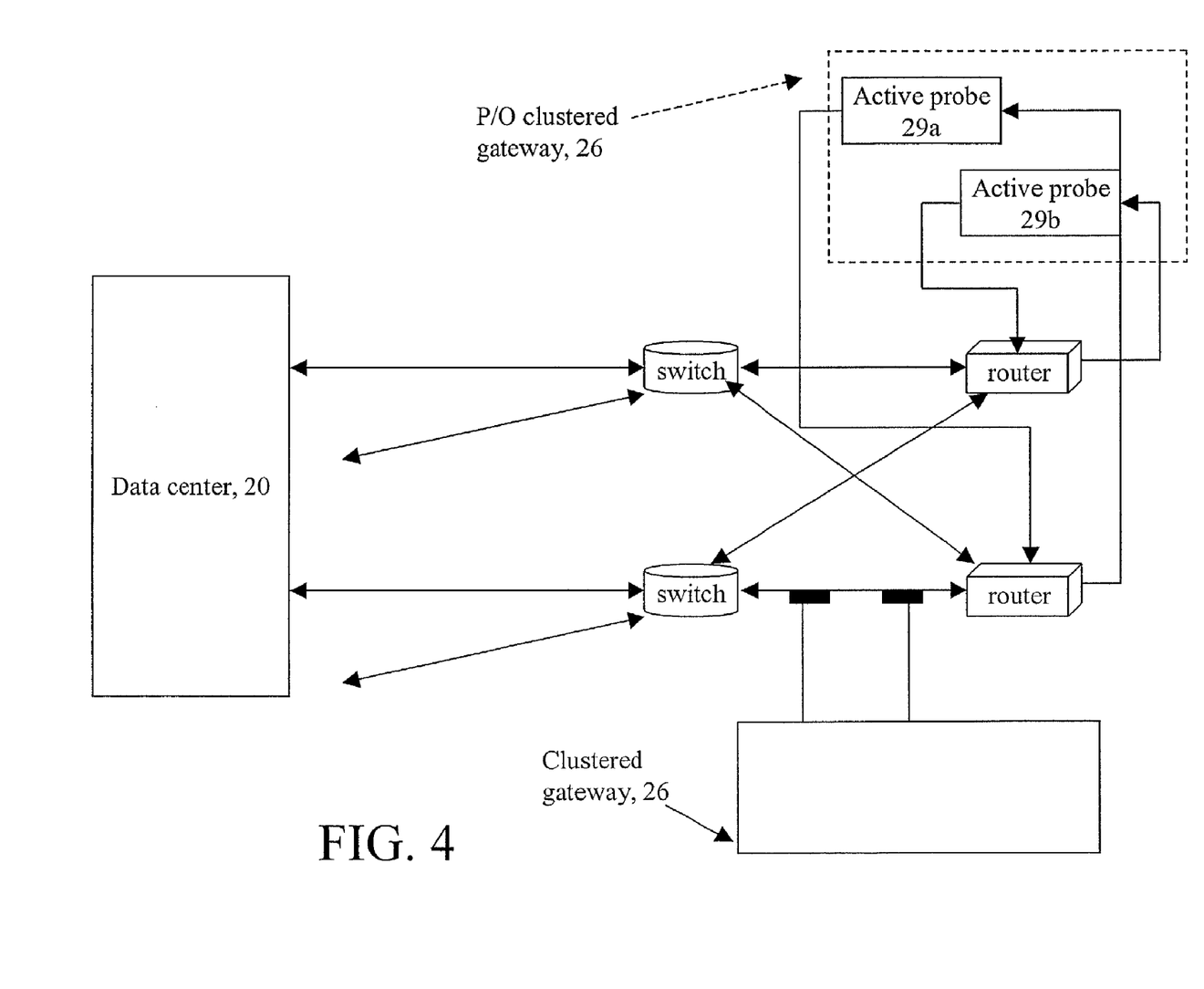
FIG. 4 is a block diagram depicting an alternative deployment scheme of the clustered monitor for a denial of service attack.

Alternatively, the simple network management protocol (SNMP) is used to communicate between the cluster head 27 and the active probes 29. Referring now to FIG. 4, the clustered gateway 26 can have active probes 29a-29n deployed in a manner that allows the active probes 29a-29n to be placed in-line during an attack, as in FIG. 3. Instead of having a link from the router to the filter, and to a downstream device, e.g., a switch as in FIG. 3, the link can come from the router into the filter and back to the same router. This arrangement would require a "policy based routing configuration" on the router to ensure that the router does not send the filtered traffic back into the filter.

Figure 5:
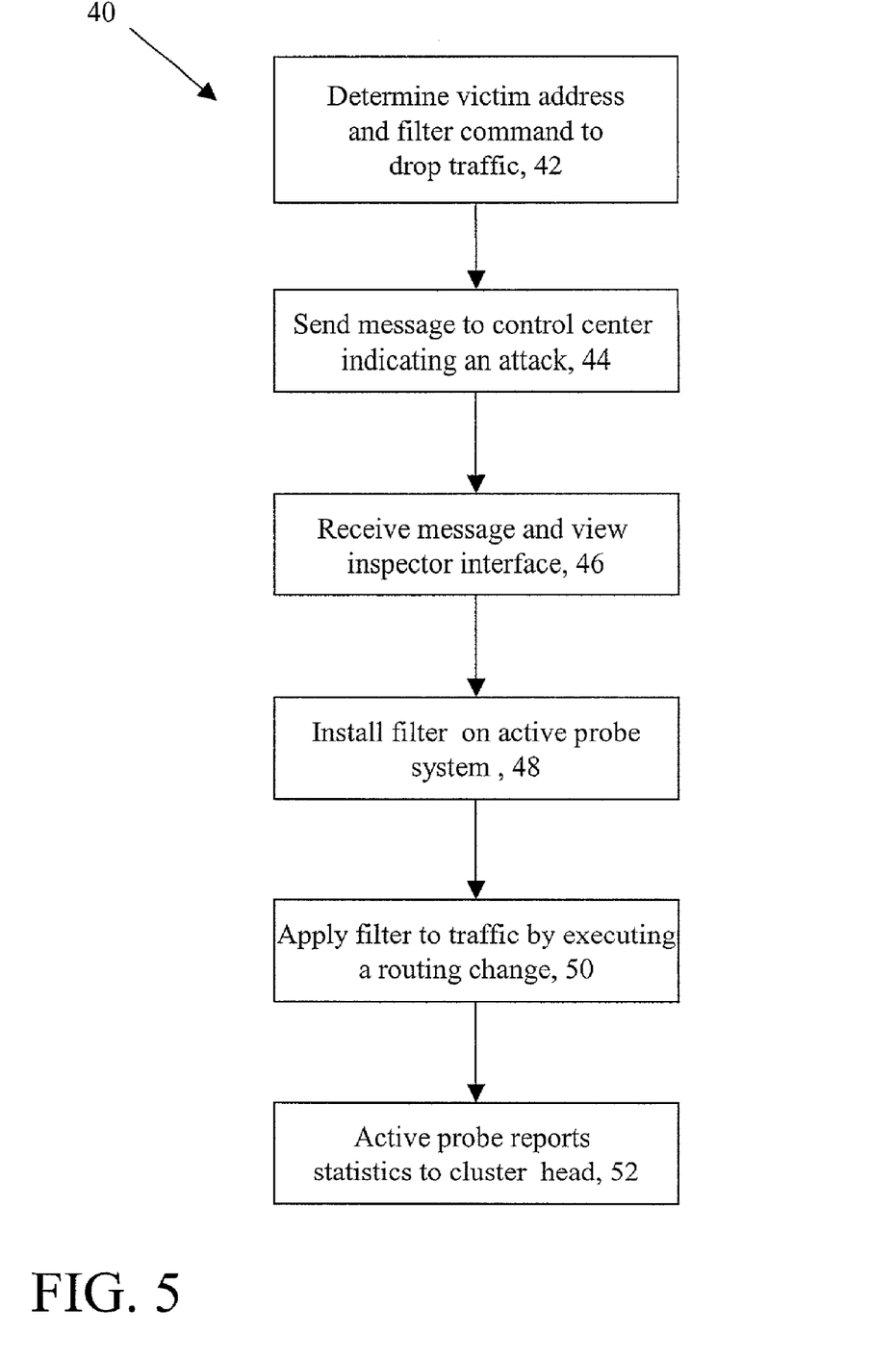
FIG. 5 is a flow chart depicting a process to deploy active probes disposed in line during an attack.

Referring to FIG. 5, a process 40 that runs on the clustered gateway 26 is shown. When under attack, the clustered gateway 26 determines 42 a victim address and an enforcement filter to install on one or more of the active probes 29a-29e in order to drop malicious traffic. The gateway sends 44 a message to the control center, e.g., an SNMP trap to indicate that it suspects an attack. The control center 24 upon receiving 46 the trap receives a recommendation to reroute the specified victim addresses through the active probes 29. The gateway 26 installs or implements 48 appropriate filters on appropriate ones of the active probes 29a-29d, as required. The user can be asked for criteria to send to the gateway as another message to mark the end of the attack. For example, one criterion might be that the hit rate for the filter goes below 1%.

The cluster head applies the filter on the active probes 29a-29n via an out-of-band connection. The monitor executes 50 a routing change by logging into the router and updating the router table (using a console connection, etc.). In one embodiment, the active probes can report traffic statistics to the cluster heads in the same way as the passive probes do and thus can have an entire picture of the traffic in the network. Thus, the active probes can also determine when the attack has subsided. Alternatively, during the attack, the appropriate one or ones of the active probes 29a-29d report 52 the observed hit rate of the filter to the cluster head.

The process determines when the attack drops off, e.g., by the hit rate declining. A trap is sent 56 to mark the end of the attack (or at least that the hit rate for that particular filter has reached a lower-bound threshold). The user obtains 58 a recommendation to remove the filter and reroute traffic back to the normal path. However, if the attack is still occurring, but the malicious traffic characteristics have changed, another filter recommendation will appear 60. If the user chooses 62 to return traffic to its normal route and remove the filter, the monitor will communicate 64 the routing change as before, and notify 66 the appropriate active probes 29a-29e to remove the filter. User interaction occurs with the probes via a graphical user interface without requiring the user to access the router.

A manual process (not illustrated) can be used to deploy the active probes 29a-29e. The manual process is similar to that described above except that the operator would perform router changes and/or filter installation manually. The clustered gateway could provide step-by-step instructions to the user for updating the routing tables.

An exemplary manual process to install filters has the cluster head presenting a filter recommendation on the user interface. The user logs into the cluster head's interface and chooses to install the recommended filter. The user can be given the option to install a custom filter. The user also sets criteria for notifying when the attack is over. Thereafter, the user may remove the filter by selecting a "remove filter" option on the cluster head interface. Other arrangements are possible. In some embodiments, while traffic is being rerouted to the active probes 29a-29b, the passive probes 26a-26n will not see traffic that is part of the attack. Therefore the passive probes 26a-26n cannot log traffic information. There are several options for dealing with this. One option would have the active probes 29a-29b also act as passive probes to report back to the passive probes 26a-26e and/or the cluster head counter summary, sample packet logs, etc.

Alternatively, the system can install taps on lines to the active probes 29a-29e and add passive probes 29a-29e to monitor the attack traffic. Optionally, with these or other alternatives, the active probes 29a-29e need not be configured to report back the hit rate to the cluster head 27 or passive probes 26a-26e.

Alternatively the passive probe arrangement can be deployed upstream of where the routing occurs. This deployment scheme allows the passive probes 26a-26e to see all traffic. Various pieces of information can be obtained from the router in order to make a non-damaging routing change. In some arrangements involving multiple routers it may be possible to divert traffic from one of the routers instead of both or all.

In some embodiments, it would be desirable to provide links to both switches or in other embodiments links to just one of the switches. With a link to a single switch, if such switch were to fail then the active probes 29a-29e would likewise fail since it would not be connected to the other. If the routers are typically connected to each other and the switches are connected to each other, it maybe possible to connect to only one of the routers, and have the other router route traffic through the one to which the active probes 29a-29e are connected.

Figure 6A:
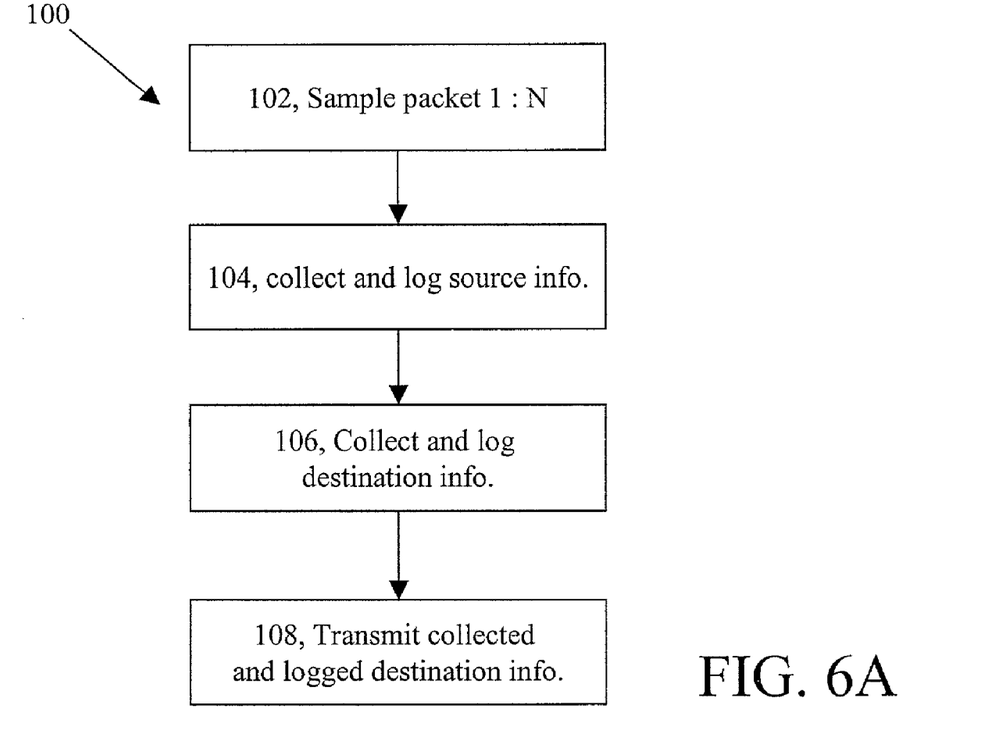
FIGS. 6A and 6B depict respectively probe and head gateway functionality.
Figure 6B:
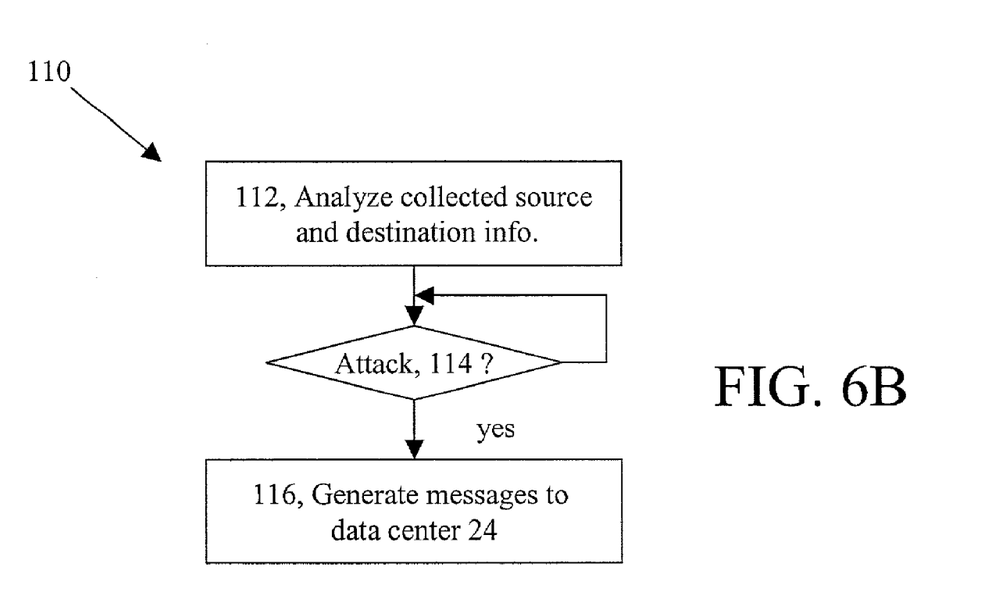

Referring now to FIGS. 6A and 6B, an exemplary operational process that can occur on one or more passive probes 26a-26n and the head server 27 is shown. On the probes a process 100 is used to sample 102 one in every N packets or to provide a random-sampling of packets. The process 100 also collects 104 and logs source information from all packets collects and logs 106 destination information from all packets. At respective points in time, the process 100 will transmit 108 the collected and logged destination and source information as well as other statistical information to the cluster head 27 and will likewise transmit sample packets to the cluster head 27.

Referring to FIG. 6B, a process 110 is shown that executes on the cluster head 27. The process 110 includes a process 112 to analyze collected source and destination information and to determine 114 whether or not the information corresponds to an attack on the victim center. If the information corresponds to an attack, the process 110 generates 116 a response to the attack. Exemplary responses can be to send a message to the data center 24 that an attack is underway. Optionally, a response can involve determining the nature of the attack and source of the attack at the gateway. In this option, the gateway 26 can determine corrective measures such as installing filters on nearby routers or by deploying more of the active probes 29a-29n with an appropriate filter. These filters block undesired network traffic as will be discussed below.

The cluster head 27 can make decisions about the health of the traffic passing by the cluster 26 and keep logs of the traffic. To do this the cluster head 27 examines a subset of the packets flowing by the cluster members, and the counters obtained from probes 26a-26n. The cluster head 27 uses the counter information to determine if a cluster gateway 26 is viewing in an attack.

The cluster gateway 26 monitoring process 74 (FIG. 4) monitors traffic that passes through the gateway. The monitoring process 74 includes a communication process (not shown) that communicates statistics collected in the cluster gateway 26 with the data center 24. The cluster gateway 26 uses a separate interface over a private, redundant network, such as a modem 39 over the telephone network or a leased line, a network adapter over a LAN, etc. to communicate with the control center 24. Other interface types are possible. In addition, the cluster gateway 26 can include processes (not shown) to allow an administrator to insert filters to block, i.e., discard packets that the device deems to be part of an attack, as determined by heuristics described below.

Figure 7:
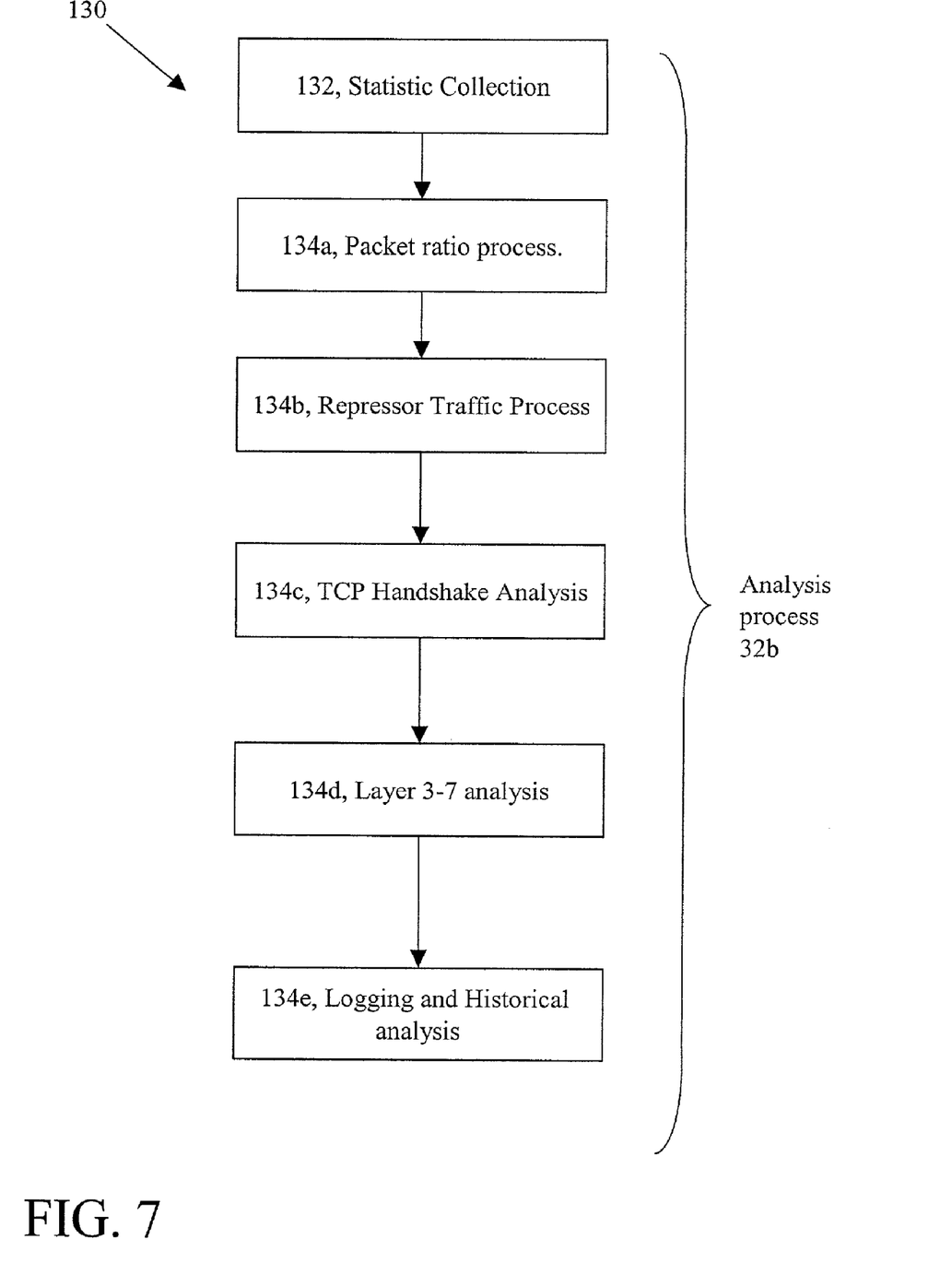
FIG. 7 is a flow chart depicting exemplary analysis processes.

Referring to FIG. 7, exemplary techniques 130 to determine if a data center is under attack are shown. The gateway 26 collects statistics 132 and analyzes the statistics according to one of the algorithms 134a-134e described below. Other algorithms can be used.

Several methods can be used separately or in combination to identify, malicious traffic flows. For example, the gateway 26 can detect DoS attacks and identify malicious flows or source addresses using at least one or more of the following methods including: analyzing packet ratios of TCP-like traffic; analyzing "repressor" traffic for particular types of normal traffic; performing TCP handshake analysis; performing various types of packet analysis at packet layers 3-7; and logging/historical analysis. Other methods can be used.

Packet ratios for TCP-like traffic 134a.

The Transmission Control Protocol (TCP) is a protocol in which a connection between two hosts, a client C, e.g. a web browser, and a server S, e.g. a web server, involves packets traveling in both directions, between C and S and between S and C. When C sends data to S and S receives it, S replies with an ACK ("acknowledgement") packet. If C does not receive the ACK, it will eventually try to retransmit the data to S, to implement TCP's reliable delivery property. In general, a server S will acknowledge (send an ACK) for every packet or every second packet.

The monitoring process in the gateway 26 can examine a ratio of incoming to outgoing TCP packets for a particular set of machines, e.g. web servers. The monitoring process can compare the ratio to a threshold value. The monitoring process can store this ratio, time stamp it, etc. and conduct an ongoing analysis to determine over time for example how much and how often it exceeds that ratio. As the ratio grows increasingly beyond 2:1, it is an increasing indication that the machines are receiving bad TCP traffic, e.g. packets that are not part of any established TCP connection, or that they are too overloaded to acknowledge the requests.

The gateway 26 can use a bucket algorithm to track traffic. The gateway divides traffic into multiple buckets, e.g. by source network address, and tracks the ratio of ingoing to outgoing traffic for each bucket. As the ratio for one bucket becomes skewed, the gateway 26 may subdivide that bucket to obtain a more detailed view. The gateway 26 raises a warning or alarm to the data center 24 and/or to the administrators at the victim site 12.

Repressor traffic 134b.

The phrase "repressor traffic" as used herein refers to any network traffic that is indicative of problems or a potential attack in a main flow of traffic. A gateway 26 may use repressor traffic analysis to identify such problems and stop or repress a corresponding attack.

One example of repressor traffic is ICMP port unreachable messages. These messages are generated by an end host when it receives a packet on a port that is not responding to requests. The message contains header information from the packet in question. The gateway 26 can analyze the port unreachable messages and use them to generate logs for forensic purposes or to selectively block future messages similar to the ones that caused the ICMP messages.

TCP handshake analysis 134c.

A TCP connection between two hosts on the network is initiated via a three-way handshake. The client, e.g. C, sends the server, e.g. S, a SYN ("synchronize") packet. S the server replies with a SYN ACK ("synchronize acknowledgment") packet. The client C replies to the SYN ACK with an ACK ("acknowledgment") packet. At this point, appropriate states to manage the connection are established on both sides.

During a TCP SYN flood attack, a server is sent many SYN packets but the attacking site never responds to the corresponding SYN ACKs with ACK packets. The resulting "half-open" connections take up state on the server and can prevent the server from opening up legitimate connections until the half-open connection expires, which usually takes 2-3 minutes. By constantly sending more SYN packets, an attacker can effectively prevent a server from serving any legitimate connection requests.

Layer 3-7 analysis 134d.

With layer 3-7 analysis, the gateway 26 looks at various traffic properties at network packet layers 3 through 7 to identify attacks and malicious flows. These layers are often referred to as layers of the Open System Interconnection (OSI) reference model and are network, transport, session, presentation and application layers respectively. Some examples of characteristics that the gateway may look for include:

1. Unusual amounts of IP fragmentation, or fragmented IP packets with bad or overlapping fragment offsets.
2. IP packets with obviously bad source addresses, or ICMP packets with broadcast destination addresses.
3. TCP or UDP packets to unused ports.
4. TCP segments advertising unusually small window sizes, which may indicate load on server, or TCP ACK packets not belonging to a known connection.
5. Frequent reloads that are sustained at a rate higher than plausible for a human user over a persistent HTTP connection.

Logging and historical traffic analysis 134e.

The gateways 26 and data collectors 28 keep statistical summary information of traffic over different periods of time and at different levels of detail. For example, a gateway 26 may keep mean and standard deviation for a chosen set of parameters across a chosen set of time-periods. The parameters may include source and destination host or network addresses, protocols, types of packets, number of open connections or of packets sent in either direction, etc. Time periods for statistical aggregation may range from minutes to weeks. The device will have configurable thresholds and will raise warnings when one of the measured parameters exceeds the corresponding threshold.

The gateway 26 can also log packets. In addition to logging full packet streams, the gateway 26 has the capability to log only specific packets identified as part of an attack (e.g., fragmented UDP packets or TCP SYN packets that are part of a SYN flood attack). This feature of the gateway 26 enables administrators to quickly identify the important properties of the attack.

Other embodiments are within the scope of the appended claims. Other potential applications can use the architecture and processes disclosed herein such as surgical filtering for non-attack related applications.

What is claimed is:

1. An arrangement disposed in a network, the arrangement comprises:
    a monitoring device that is logically disposed adjacent to logically nearby routers, the monitoring device including:
    a first type of probe that is disposed to sample traffic; and
    a second type of probe disposed in-line in response to sampling of traffic based on detection of an event corresponding to an attack on a data center with the monitoring device executing routing changes on nearby routers to redirect packets with destination addresses for the data center under attack to the second type of probe.

2. The arrangement of claim 1 wherein when the attack has ended, a new routing change is deployed to have traffic rerouted back to the original route that existed prior to rerouting through the second probe.

3. The arrangement of claim 1 wherein the monitor device applies a filter on the second type probe.

4. The arrangement of claim 1 wherein the monitor device executes a routing change by logging into the router and updating the router table.

5. The arrangement of claim 1 wherein during the attack, the second type probe reports statistics on packet traffic sent to a cluster head so that the cluster head can detect when the attack has ended.

6. The arrangement of claim 1 wherein during the attack, the second type probe reports an observed hit rate of the filter to a cluster head to determine when the attack has ended.

7. The arrangement of claim 5 wherein when the attack has ended, the monitor device communicates a new routing change to have traffic rerouted back to the original route that existed prior to rerouting through the second probe and to notify the second probe to remove the filter.

8. The arrangement of claim 4 wherein if the attack is still occurring, but the malicious traffic characteristics have changed, another filter is installed on the second probe.

9. The arrangement of claim 1 wherein the monitor device further comprises:
    a communication process that communicates collected statistics concerning the traffic with a control center and that can receive queries or instructions from the control center.

10. The arrangement of claim 1 wherein the communication process couples to a dedicated link to communicate with the control center over a hardened network.

11. A device comprises:
    a cluster head;
    a plurality of passive probes disposed between a network and a data center, the passive probes collecting statistical data on network packets that are sampled by the passive probes to analyze the statistical data and report the collected statistical data to the cluster head; and
    a plurality of active probes disposed in-line in the network to receive network packet traffic having a destination address for the data center, the active probes provided to filter the network traffic intended for the data center with the active probes each having at least one enforcement filter configured to drop packets having the destination address of the data center and that the cluster head deems malicious traffic;
    wherein the cluster head applies the filter on the active probes via an out-of-band connection executing a routing change and updating router tables on nearby routers.

12. The device of claim 11 wherein router tables are modified to route traffic with the destination address of the data center through at least one of the active probes during an attack.

13. The device of claim 11 wherein the active probes report statistics on the traffic to the cluster head so that the cluster head can detect when the attack has ended.

14. The device of claim 11 wherein when the attack has ended, the device communicates a new routing change to have traffic rerouted back to the original route that existed prior to rerouting through the probe.

15. The device of claim 11 wherein the cluster head comprises:
   a communication process that communicates collected statistics concerning the traffic with a control center and that receives queries and instructions from the control center.

16. The device of claim 11 wherein the communication process couples to a dedicated link to communicate with a control center over a hardened network.

* * * * *